(12) United States Patent
Gandolfo et al.

(10) Patent No.: US 7,270,769 B2
(45) Date of Patent: Sep. 18, 2007

(54) PRECURSOR FOR PREPARING AN OPTICAL MATERIAL, METHOD AND OPTICAL COMPONENTS OBTAINED WITH SAME AND USES THEREOF

(75) Inventors: Viviane Gandolfo, Nice (FR); Herve Guillard, Nice (FR)

(73) Assignee: Polymage S.A.R.L., Nice (FR)

( * ) Notice: Subject to any disclaimer, the term of this patent is extended or adjusted under 35 U.S.C. 154(b) by 285 days.

(21) Appl. No.: 10/276,883

(22) PCT Filed: May 17, 2001

(86) PCT No.: PCT/FR01/01518

§ 371 (c)(1),
(2), (4) Date: May 8, 2003

(87) PCT Pub. No.: WO01/88061

PCT Pub. Date: Nov. 22, 2001

(65) Prior Publication Data

US 2004/0042100 A1 Mar. 4, 2004

(30) Foreign Application Priority Data

May 19, 2000 (FR) .................................. 00 06594

(51) Int. Cl.
*C09K 19/52* (2006.01)
*C09K 19/38* (2006.01)
*C09K 19/54* (2006.01)
(52) U.S. Cl. ................ 252/299.01; 252/299.5
(58) Field of Classification Search .......... 252/299.01, 252/299.5; 428/1.1
See application file for complete search history.

(56) References Cited

U.S. PATENT DOCUMENTS

| | | | |
|---|---|---|---|
| 4,938,568 A | 7/1990 | Margerum et al. | |
| 5,976,239 A * | 11/1999 | Dannenhauer et al. | ...... 106/493 |
| 6,017,468 A | 1/2000 | Chung et al. | |
| 6,083,575 A | 7/2000 | Ninomiya et al. | |

FOREIGN PATENT DOCUMENTS

| | | |
|---|---|---|
| EP | 0 703 287 A1 | 3/1996 |
| WO | WO98/04650 | 2/1998 |
| WO | WO 00/60407 | 10/2000 |

* cited by examiner

*Primary Examiner*—Shean C Wu
(74) *Attorney, Agent, or Firm*—Young & Thompson

(57) ABSTRACT

A precursor for the preparation of a material with optical properties modifiable under the action of at least one external parameter, comprising a component A constituted by polymerizable monomers or oligomers, a component B comprising one or several liquid crystals with low molecular weights or polymers and having a type of molecular order that is nematic, cholesteric or smectic or having polymorphism, and at least one surface agent C whose molecules have an affinity both for component A and for component B, and comprising simultaneously one or several chemical groups that can attach chemically to the constituents of component A, and one or several chemical groups comprising a mesogenic portion compatible with the mesomorphic phase of component B, so as to control the interfacial properties between components A, and B during polymerization.

17 Claims, 11 Drawing Sheets

PRECURSOR FOR PREPARING AN OPTICAL MATERIAL, METHOD AND OPTICAL COMPONENTS OBTAINED WITH SAME AND USES THEREOF

The present invention relates to a precursor for the preparation of materials with optical properties modifiable under the action of at least one external parameter.

It moreover relates to a process for the production of a component with optical properties modifiable under the action of at least one external control parameter.

It further relates to optical components and uses of optical components.

It will particularly find use in the fields of eyeglasses, clocks, windows, visualization, lighting, optical instrumentation, electronic display, which use optical components having very diverse functionalities such as for example and without limitation:

transmission with filtering as to wavelength of light, or a reflection of the latter or a controlled attenuation of light flow as is the case in the field of windows, various lens effects in the fields of eyeglasses or clocks, a diffusion of light or birefringence involved in certain films used or in electronic display.

Liquid crystals are commonly used for the construction of display screens. Formerly, non-polymer materials were used.

However, for several years, polymers have made their entry into the optical applications.

There are known at present components which sometimes have spatial modulation of the index of refraction—in eyeglasses for example—but they are thus passive, which is to say that locally, the index—or the indices if the medium is anisotropic: in this latter case there will be designated in what follows, by index of refraction, the mean index of refraction which takes into account the ordinary and extraordinary indices of the medium as well as the orientation of the optical axis relative to the direction of propagation of the light—is fixed once for all time.

For certain other components, it is possible to modify temporally the index of refraction of the medium as is for example the case in an electronic display with liquid crystals.

They have however major drawbacks.

Thus, they permit, by applying an electric voltage on the transparent electrodes disposed on the material, only one uniform modification of the light transmitted or reflected by the optical component such as a pixel or a segment of the display.

Their possibilities and their fields of application thus are greatly reduced.

There exists no material or associated process permitting obtaining an active optical component in which the spatial modulation of the index of refraction is predetermined. The process of the present invention overcomes this thanks to a precursor containing a crosslinkable surface agent which permits fixing, at least temporarily, the interfacial properties between the components which constitute it. By spatial modulation is meant a modification having any form periodic or not, continuous or not, having or not a gradient form.

At present, when the optical components are transparent without applied voltage, it is not possible to obtain a predetermined spatial modulation during application of a voltage. The present invention permits overcoming the drawbacks that are encountered at present.

When the components reflect light they do it over a narrow range of wavelengths which is not adjustable. The present invention permits overcoming the drawbacks encountered at present.

Certain patents, using or not a surfactant, seek to obtain a spatial modulation of the optical properties but this modulation is not predetermined. This is particularly the case in U.S. Pat. No. 4,438,568. The present invention improves this by using a surface agent permitting controlling the interfacial properties and simultaneously fixing them, at least temporarily, by reticulation.

Generally speaking, this material can be used in the fields mentioned above by giving supplemental functionalities which impart value to the present application and permit envisaging others. More generally, it serves in all the applications in which an optical component—no matter what the nature of its operation: by transmission, reflection, absorption of diffusion of light—is desirable or necessary. In one of its modifications, the material is passive and its process of preparation constitutes an original manner of producing passive materials with modulation or gradient of index. In another modification, if the modulation of the index of refraction is small, it produces an active optical component adapted to modify uniformly the light transmitted or reflected. By optical component is meant a component operating in the field of wavelengths of visible light but also beyond this range and in particular in the ultraviolet, infrared.

The invention offers both a spatial modulation of the index of refraction and a control for the modification of the optical properties of the component.

Other objects and advantages will become apparent from the description which follows.

The present invention relates to a precursor for the preparation of a material with optical properties modifiable under the action of at least one external parameter. This precursor which comprises:

a component A constituted of monomers or polymerizable oligomers, a component B comprising one or several liquid crystals with small molecular weights or polymers and having a type of nematic, cholesteric or smectic molecular order or having polymorphism, is characterized in that it comprises moreover:

at least one surface agent C whose molecules have an affinity both for component A and for component B and comprising simultaneously one or several chemical groups that can attach chemically to the constituents of component A, and on the other hand, one or several chemical groups comprising a mesogenic portion compartible with the mesomorphic phase of component B, so as to control the interfacial properties between said components A, B during polymerization, for the preparation of a material having a spatial modulation of its optical properties.

This precursor could be present in the embodiments cited hereafter:

the surface agent C is polymerizable.

The surface agent C comprises component A.

Component B comprises at least one liquid crystal with dielectric anisotropy changing sign under external action or parameters.

Component B comprises at least one liquid crystal with positive dielectric anisotropy.

Component B comprises at least one liquid crystal with negative dielectric anisotropy.

It comprises a photo-initiator compound for the polymerization by photochemical action.

Component B comprises one or several additives selected from colorants, photochromic compounds and chiral dopants, mesomorphic or not.

It has the weight proportions:
60 to 80% component A
40 to 20% component B
the surface agent C is 1 to 5% of the whole of components A and B, by weight.

It has, by weight proportion:
70 to 97% of component B
30 to 3% of surface agent C.

The present invention also relates to a process for the production of a component with optical properties modifiable under the action of at least one external control parameter, characterized by the fact that the precursor according to the invention is used, that said precursor is subjected to the action of spatial modification means of its index of refraction, that there is fixed, at least temporarily, the spatial modulation of the index of refraction by polymerization.

This process could have the following modifications:

the polymerization and the action of spatial modulating means are simultaneous.

The spatial modulation means are selected from means for the application of an electric field, heating means, a variable concentration of one of the chemical species or of the means for application of luminous intensity.

A mold or a substrate is used for deposition of the precursor, electrically conductive electrodes of the desired shape are positioned in the mold or on the substrate to constitute one of the spatial modulation means of the index of refraction by means of the use of an electrical field, the precursor is positioned in the mold or on the substrate.

The electrodes are of transparent materials such as indium tin oxides deposited on transparent materials such as glass or a plastic material or else conductive polymers to produce a photo-induced polymerization.

Electrodes are used as the external control parameter.

The invention also relates to an optically active component of the type of lenses and diffraction gratings that can be obtained by the process characterized by the fact that it comprises an active film produced from the precursor and two transparent covering electrodes, each covering one surface of the active film or deposited on a substrate and whose internal surface in contact with the active film is electrically conductive to apply an electric field between the two internal surfaces, as well as an active component that can be obtained by the process, characterized by the fact that it comprises at least one plate or active film made from the precursor and forming or incorporating itself in a construction wall.

This latter component could be such that the plate or active film is selected to be transparent without the action of the external control parameter.

the plate or the active film is selected to be reflective over a range of wavelengths whose width is adjustable by the spatial modulation means.

The invention finally relates to the application of a component with modifiable optical properties under the action of at least one external control parameter adapted to be obtained by the process with the formation of an infrared modulator.

It also concerns the application of a component with modifiable optical properties under the action of at least one external control parameter, adapted to be obtained by the process with the formation of an active component reflecting light.

The accompanying drawings are given by way of indicative examples and are not limiting. They represent a preferred embodiment according to the invention. They permit easy comprehension of the invention.

Figure 1:
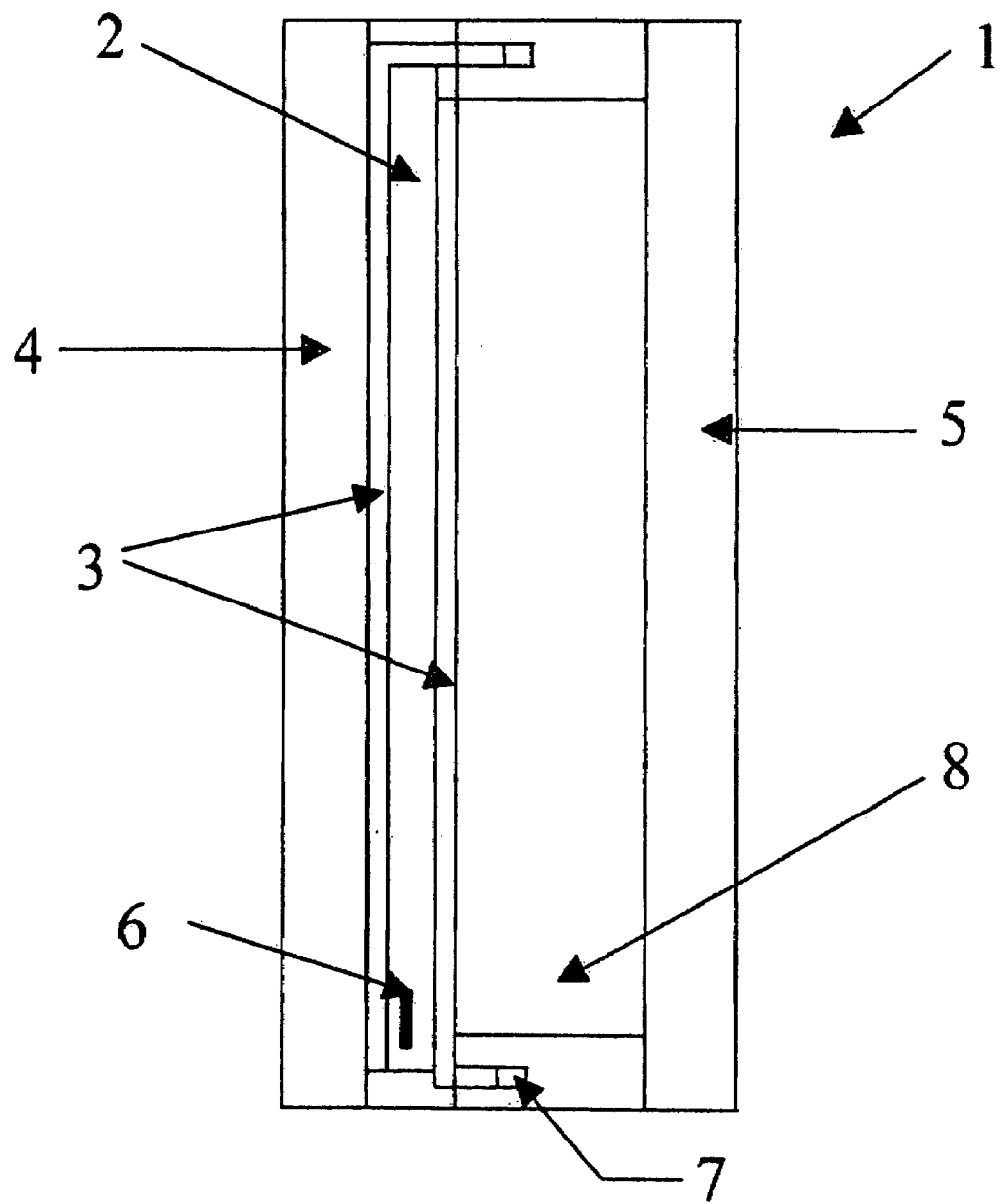
FIGS. 1 and 2 show an example of application of the invention to a glazed wall.

In what follows of the description, there is meant by action of an external parameter the use of an external energy source and particularly: an electrical field (difference of applied potential), a light flux of natural or artificial origin.

Moreover, the expression active optical component corresponds to a component whose optical properties are modifiable under the action of an external parameter.

The precursor of the material uses mixtures comprising:

A component A constituted by monomers or oligomers, chiral or not, which by polymerization in the presence of other compounds will provide a homogeneous or heterogeneous plastic material such as a gel or a micro-composite. Numerous compounds and in particular those adapted to lead to photo-induced polymerization reactions, are suitable. There is for example found in the work of J. Fouassier: Photoinitiation, photopolymerization and photocuring (Hanser, Munich, 1995, page 145) a description of several typical reactions in cases such as those of mono and multifunctional acrylates, unsaturated polyester resins, or else thiol-ene resins. Various commercially available mixtures using such monomers and oligomers are sold by companies such as Norland® or Protex®.

A component B comprised by liquid crystals or mixtures of liquid crystals of low molecular weight or polymers and having a type of molecular order conventionally provided by these compounds, which is to say nematic, cholesteric or smectic or having polymorphism. These liquid crystals have either a negative or a positive optical anisotropy or else a dielectric anisotropy changing in sign with a parameter such as the frequency of an applied electrical field or temperature. They can be doped with different additives such as colorants, photochromic compounds, chiral dopants that are mesomorphic or not.

The nematic, cholesteric, or smectic mixtures can be formulated from pure components commercially available or purchased once formulated by specialized producers such as Merck®, Chisso®, Dainippon Ink®, Valiant Fine Chemicals®, Rolic®. The compounds used in the examples can be replaced by mixtures using commercial products such as mixtures E7 or E90 of Merck® which are nematic with strong dielectric anisotropy, the chiral dopants of the series CE or CB15 or else C15 or S1082 or S811 are obtained also from Merck®. Finally, liquid crystal mixtures having a change of dielectric anisotropy as a function of the frequency, can be replaced by mixtures 2F-3333, 2F-3361 from Rolic®.

A component C constituted by a surface agent, chiral or not, most often polymerizable or a mixture of surface agents permitting, during polymerization of the precursor, to control the interfacial properties between the liquid crystal and the polymer and to induce a temporary spatial non-uniformity of the material. By temporary is meant a non-uniformity which can be modified or even cancelled by the action of an external parameter such as an electrical field. The surface agent is selected such that the molecules which comprise it have a double affinity: on the one hand for the liquid crystal and on the other hand for the polymer. This affinity is manifested for example by the formation before polymerization of a single phase by mixture with the components A and B. These are particularly molecules comprising simultaneously a group that can attach chemically to the monomers of type A and on the other hand to a chemical group compatible with the mesomorphic phase of type B, in particular this group can itself be mesogenic. Numerous compounds such as those of the company Wacker-Chemie GmbH® such as photopolymers CC3939 or CC4070 or else such as the products RM9 or CM14 or CM7 of Polymage or else in certain cases RM257 of Merck®, are suitable for component C. The compounds LC 242/756 of the Paliocolor® series of Bayer® can also be used. If for example the compound of type A contains, in addition to the photoinitiator, monomers of the acrylate or methacrylate type, there can be used a component C constituted by comb polymers having acrylate or methacrylate reactive groups and containing moreover mesogenes selected to be compatible with the component B. Photopolymerizable liquid crystal silicones such as CC3939 or CC4039 or else CC4070 of Wacker-Chemie GmbH® which are mixtures of reactive monomers and comb polymers with a siloxane skeleton and a methacrylate function in the side chain, satisfy these criteria quite well, because the side groups comprise moreover chiral mesogenes derived from cholesterol and nonchiral, which are both compatible with the liquid crystal phase, and are in a ratio which determines the chirality of the mixtures.

Most often, the two principal components A and B, which is to say the monomers and the liquid crystals, form the principal portion of the material, and the surface agent C is present in only a small fraction (less than several percent), however an important variant of the material includes the case in which A does not exist but in which the molecules of surface agent C comprise polymerizable groups such as A.

The relative proportions of A and B are anywhere within the range 0 to 100%, however in practice two cases are particularly important:

The one in which A is predominant: typical formulations being for example: A comprised between 60 and 80%, B comprised between 40 and 20%, and surface agent C being selected as a small percentage of the assemble A+B (for example 3%). For a mixture comprising 70% A, 30% B and in which surface agent C represents 3% of the whole, the relative compositions of A, B, surface agent C will be indicated by 70/30//3.

The one in which B is predominant: typical formulations being for example B comprised between 70 and 97% and surface agent C comprising groups of type A, comprised between 30 and 3%.

Moreover, when the compounds A and B are polymerized by photochemical action, there is systematically added to them a photoinitiator in a small proportion which represents in general 1 to 3% of their weight. The photoinitiators used come from Ciba-Geigy® and are sold under the mark Irgacure®. Most often, Irgacure® 907 in a proportion of 2% is preferred.

From the precursor set forth herein, it is possible to obtain a material permitting producing an active optical component.

A process for this purpose also forms a part of the invention. There are hereafter described the principal phases in a preferred embodiment.

There is induced before or in the course of polymerization by means such as an electric field, a spatial modulation of temperature, or of concentration of one of the chemical species, or else by luminous intensity, a temporary spatial non-uniformity of the material and there is utilized polymerization at a point or in a region more extended to conserve this non-uniformity or the non-uniformity which results from it. The modulations in question relate to the quantities such as temperature, concentration or concentrations of certain chemical species, or else the illumination can have or not the form of gradients.

A homogeneous material, which is to say having a single phase, can be spatially non-uniform; the causes of non-uniformity can be various and in particular associated with a different orientation of the molecules which modulate locally the index of refraction.

A heterogeneous material comprising two or several phases can moreover be spatially non-uniform; in this case, the spatial non-uniformity depends on the phases present: thus for example, in the case of a micro-composite having micro-inclusions, the parameters such as the density or size of the micro-inclusions are modulated spatially, whilst for a gel, it is the parameters such as density or shape or orientation of the polymeric network which are spatially modulated.

The spatial non-uniformity can be of any type: in a film for example it is axial, which is to say perpendicular to the plane of the film, or radial such as that relative to a radial gradient from a point on the surface of the film or else of any shape that is periodic or not. It permits inducing a spatial modulation of the index of refraction of the material. The examples cited later permit exactly describing this property.

The spatial non-uniformity of the material is created by processes such as a spatially modulated electric field, a temperature gradient. The non-uniformity is also generated by polymerization as in the case of a photopolymerization in which the UV radiation penetrates more or less deeply into the thickness of the specimen or else when the different portions of the specimen are not subjected to uniform UV radiation such as that which can be produced thanks to a set of masks or any other optical means.

The polymerization can be carried out at a point—or in a so-called local limited zone—or in a more extended zone. For example, the index of refraction or the mean index of refraction can be locally modified if the medium is anisotropic, by an electric field or the local zone is polymerized where the index of refraction has a desired value.

The inhomogeneity is more or less important. The limit case is that of low inhomogeneity leading to a homogenous material. When the polymerization produces a phase separation leading to a microcomposite, the inhomogeneity of the optical properties can result from a spatial inhomogeneity of morphology of the composite.

The process of the invention and the precursor also presented, permit obtaining optical components adapted to find their application in numerous fields.

There is described hereafter a possibility for obtaining such optical components.

Optical components are obtained by the shaping of the material, or of materials associating said material with other materials. This shaping is carried out on the precursor, by means such as deposit on substrates or filling of a mold, a reservoir or a cell on the walls of which have been deposited transparent electrodes of various shapes. The transparent electrodes of various shape can also be deposited on the polymerized material used in that condition or surfaced.

The shaping of said material, or of the constituent materials, for obtaining an optical component, takes place by conventional means which depend on the shape of the component.

If it is a film, different processes of manual or automatic spreading such as screeds or "coaters" or rollers or else serigraphy can be used. It is also possible to place the precursor in an elongated cavity of regular and flat shape to be polymerized there and to form a film, or else it can be placed in a cavity of any shape before polymerization. In the case in which the inhomogeneity is obtained by an electrical field, electrodes in the selected shapes are disposed on the internal walls of the cavity. When the polymerization is optically assisted, these electrodes are transparent and made from materials such as indium tin oxides (ITO) which can be engraved to have predetermined shapes, or by any other process permitting obtaining transparent and conductive electrodes, such as those which use solutions of conductive polymers. If it is a film, it can be interesting to apply an electric field over all or a portion of the latter thanks to plastic supports that do not have good adherence with the polymerized film. It is thus possible to separate the supports of the active film after polymerization without altering it. Thus other transparent electrodes (CPP 105 T of Bayer® for example) permitting acting on the properties of the film, can be deposited eventually on the latter. The electrodes permitting forming the film and those permitting controlling it, can have either the same shape or a different shape. Before depositing the electrodes, the material can be surfaced to give it the desired shape.

The control of the component is effected by transparent electrodes such as ITO deposited on transparent glass or plastic substrates placed on the active film, or solutions of conductive polymers deposited directly on the constituent or constituents of the optical component. The control electrodes can be different from the electrodes which if desired serve to create the spatial inhomogeneity, which permits modifying in a way that is most often reversible, the temporary spatial non-uniformity of the material and hence its optical properties.

When the transparent electrodes are constituted by conductive polymers, the processes such as serigraphy are used for deposition. Other conductive materials having good transparency such as glass or plastic substrates covered with ITO are commercially available from the companies IST, Balzers, Southwall. They can also be made in laboratories, in particular on glass by methods such as those described by T. Kanbara, N. Nagasaka, T. Yamamoto in Chem. Mater. 1990, 2, 643 to 645. In the case of optical components formed by associating several electrically controllable materials, the association of these latter can take place in different ways in particular by superposition. Stacking, not necessarily flat, is carried out by superposing either materials comprised between two substrates or materials without a substrate on which are deposited transparent electrodes. The different stacked materials can be controlled independently with voltages and frequencies of independent control signals.

As indicated above, the invention has the advantage of widening the field of application of active optical components.

By way of example illustrating this, there are given hereafter several modifications of the invention according to the desired use. Indicative compositions of precursor are also given in each case. Similarly, a mode of effecting the spatial modulation and the control, is mentioned.

I—Active Optical Component of the Lens Type and Diffraction Grating

Composition: A mixture comprising a thiol-ene resin of the type NOA65 (Norland®) and a nematic liquid crystal with positive anisotropy of the YM6 type (Valiant Fine Chemicals®) whose ordinary index is very near the index of the thiol resin, and a polymerizable surface agent of the type RM9 (Polymage) is placed between two thick plastic films of 50 micrometers (microns) and covered with ITO (IST). The ITO surfaces are in contact with the mixture and the spacing between the two plastic films is 30 microns. The mixture also contains a photoinitiator (Irgacure® 907 of Ciba-Geigy®) whose weight proportion of RM9 is 2%. The respective resin/crystal liquid/additive proportions are respectively 70/30/3.

Induction of non-uniformity: A mask constituted alternately of black portions and transparent portions is placed on the upper sheet. The designs of the mask represent a series of concentric circles forming a Soret grid. It is a diffraction grid with symmetry of revolution having a radial periodicity according to the square of the radius. There is applied a strong field (2 V/micron) to the film and there is carried out a polymerization under the field with for irradiation parameters: 0.6 mW/cm$^2$ for 10 minutes. Only the portions that are not covered by the black regions of the mask are irradiated. Given the positive dielectric anisotropy of the liquid crystal, the field orients the molecules perpendicularly to the plastic films, and thanks to the surface agent, this orientation is maintained after the field is turned off. Without a surface agent, this orientation is not maintained. The component is then irradiated without a dielectric field and after having removed the mask. The previously irradiated zones remain identical, which is to say transparent, whilst the other zones become opaque white.

Shaping: The resulting sandwich comprised by two plastic films covered with ITO (constituting the control electrodes) within which has been formed the active film, constitutes in this condition the optical component.

Control for the modification of optical properties: The optical element obtained, illuminated with monochromatic light and with no applied field, functions as a Soret grating. The application of the electric field cancels this function. A field of IV/micron applied between the two ITO films renders the component completely transparent. The same principle is applicable to any type of component using the defractive optics of a micro-grating or Fresnel lens.

The YM6 can be replaced by mixtures of positive dielectric anisotropy such as mixtures of E7 or E90 of Merck®. The thiol-ene resin NOA65 can be replaced by Norland® resins such as NOA68 or NOA81 or other types of resins such as acrylates such as HM20 (Aldrich®) or else a mixture of these resins. Thus, the mixtures NOA65/HM20 in different proportions have been used with success.

The RM9 can be replaced with components such as CC3939 or CC4070 of Wacker-Chemie GmbH®.

II. Active Optical Component having High Transparency at Rest and Adapted to be Integrated into a Wall of a Building in the Form of a Window of the Venetian Type There are presented in this portion several versions of an optical component obtained from precursor mixtures with which is associated for each of the mixtures a specific process of preparation. All these precursors lead to carrying materials of the same functionality, that of an active optical component having high transparency without application of an electric field, and used as an optical component in a window of the Venetian type.

Figure 2:
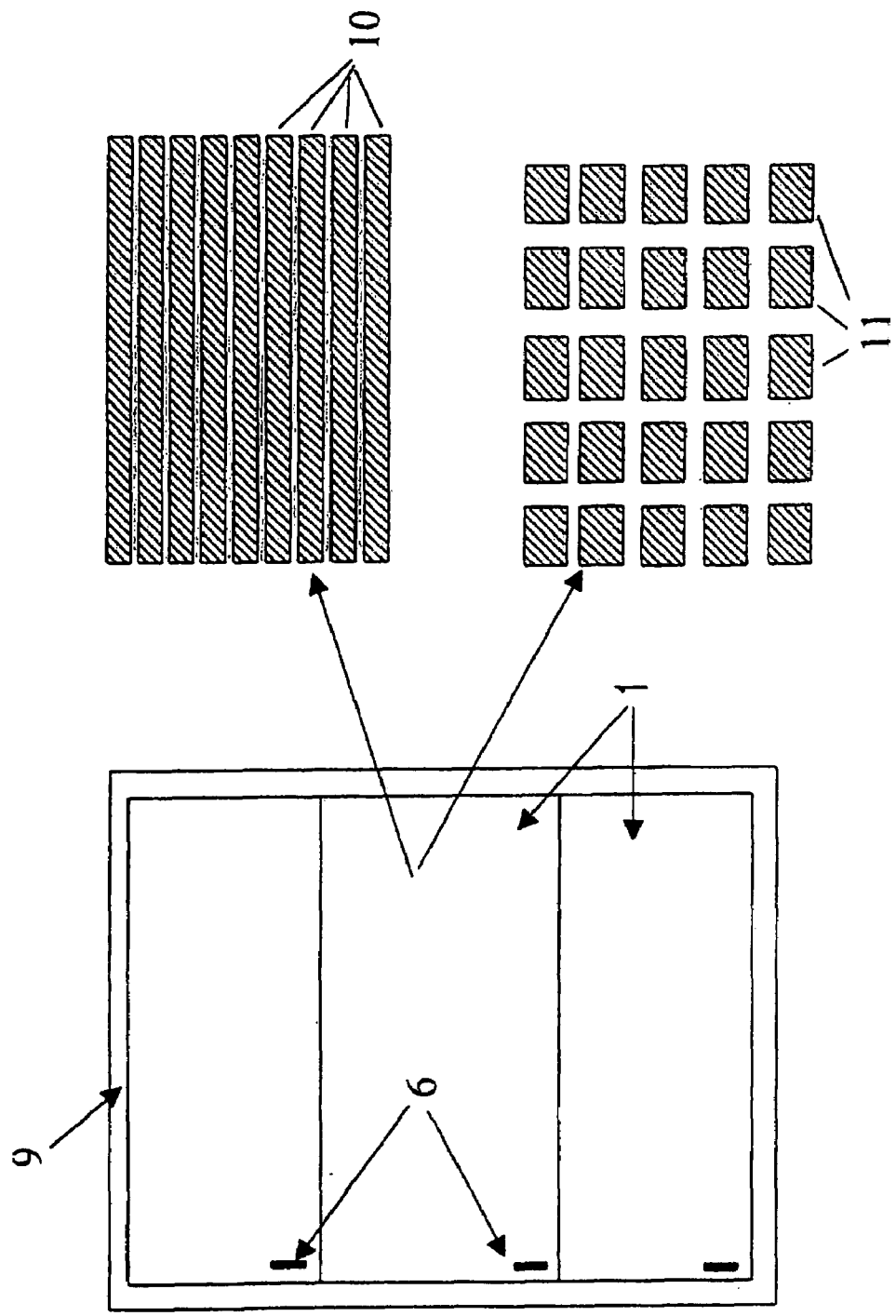

FIGS. 1 and 2 show this arrangement.

II-1 EXAMPLE II-A

Composition: A mixture comprising on the one hand a thiol-ene resin of the NOA65 type (Norland®) and an HM20 resin (Aldrich®) in respective weight proportions of 80/20 and a liquid crystal of the KDK07 type (Polymage) whose frequency of cutting, which is to say the frequency for which the dielectric anisotropy changes in sign, is 1 KHz, and a polymerizable surface agent of the type RM9 (Polymage) to which is added a photoinitiator which represents 2% by weight of the RM9 compound, is disposed between two plastic films (3) (20×30 cm) of 125 microns thickness, having a resistivity of 70 ohms per square, covered with ITO from the IST company. The ITO surfaces are in contact with the mixture and the spacing between the two plastic films is 50 microns. The respective proportions of resin/crystal liquid/additive are respectively 70/30//3. The mixture also contains a photoinitiator (Irgacure® 907 of Ciba-Geigy®) whose weight proportion of the RM9 is 2%. The plastic films have first been assembled by pressing after deposition of a peripheral cement joint deposited by serigraphy, the resulting cell has two openings to carry out filling by capillarity, the thickness of the space between the two plates is calibrated by adding to the cement balls of a calibrated diameter and calibrated spacers between the plastic films. The latter can be obtained from from Dyno® particles AS, Lillestrome, Norway or Duke Scientific Corporation®—Palo Alto, USA.

Induction of non-uniformity: A mask comprising successive stripes of unequal width—in our example respectively 1 mm and 20 mm—and alternately transparent lines (1 mm) and black lines (20 mm) is provided, called a positive mask. A negative mask is also provided with black stripes of 1 mm and transparent stripes of 20 mm.

The so-called negative mask is placed on the upper plastic film and there is carried out a polymerization under a field whose value is relatively high (2V/µm) and of low frequency (500 Hz). Low frequency means a frequency substantially lower than the cutoff frequency of the liquid crystal. The polymerization carried out under wide bands results in transparent zones and the orientation of the molecules perpendicularly to the plane of the film is maintained after cutting off the electric field, thanks to the surface agent RM9. It is not maintained if this agent is not present.

The so-called positive mask is superposed on the plastic film at the place previously occupied by the negative mask, and so the zones previously exposed are hidden and the zones previously hidden are now exposed. There is thus carried out a polymerization under a field, whose value is relatively high 2 V/µm, of high frequency (20 KHz), high frequency meaning a frequency substantially greater than the cutoff frequency of the liquid crystal. The polymerization which takes place under the narrow strips results in transparent zones and the orientation of the molecules parallel to the plane is maintained after cutting off the electrical field thanks to the surface agent RM9.

Shaping: The resulting sandwich comprised by the two plastic films covered with ITO within which has been formed the active film (2) is integrated into a glazed element constituting a window. It is placed within a double pane on the external surface. The double pane (4, 5), if desired provided with an anti-UV film on its external surface, is shown in FIG. 1. The designs in the form of wide rays (10) occupy all or a portion of the window and are replaceable by designs of any form. By way of example there is shown an assembly of rectangular designs (11).

Figure 3:
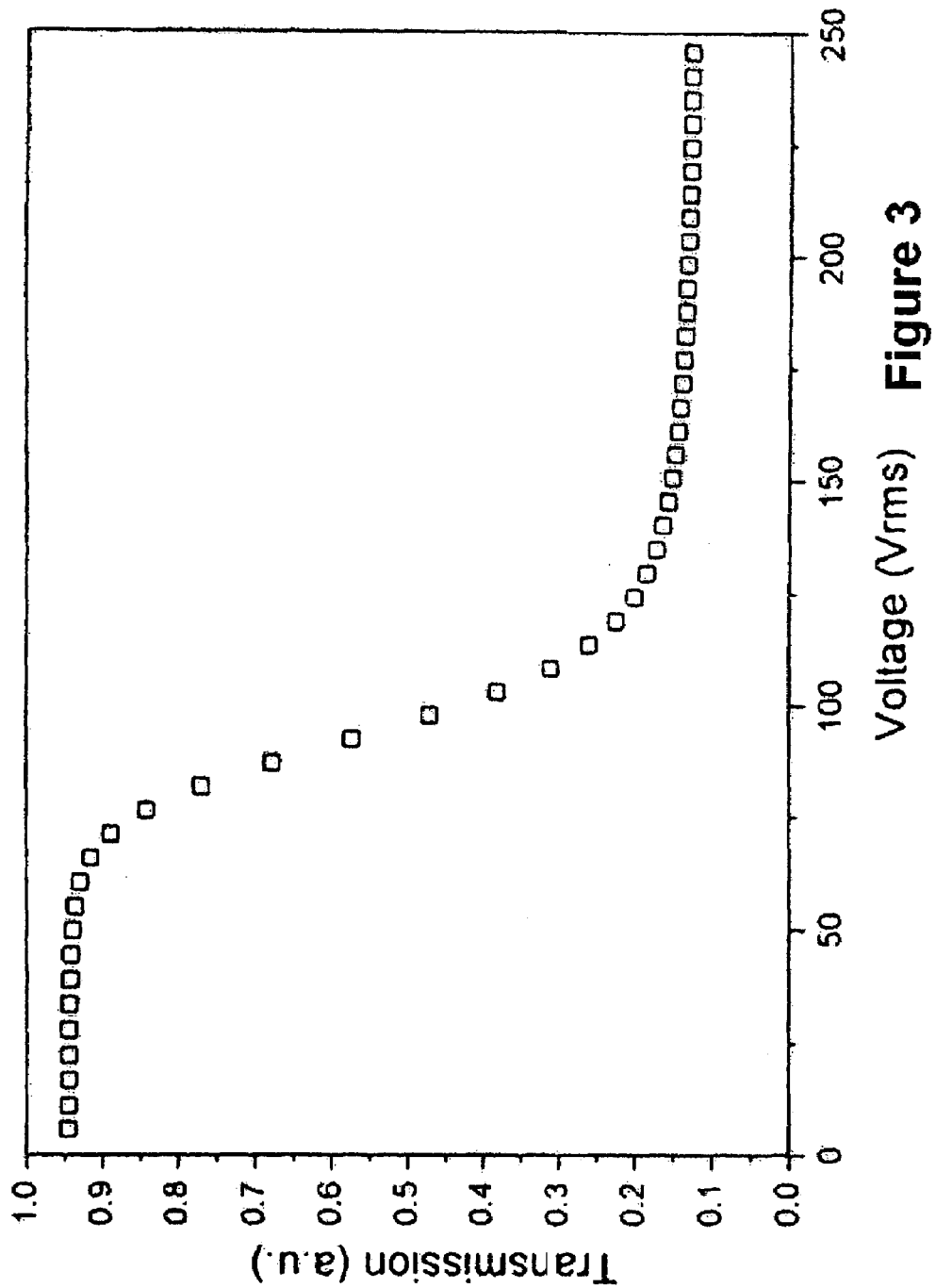
FIGS. 3 to 5 show variations of the quantity of transmission of an optical component as a function of the applied control voltage, according to three examples.

Control: A control device (7) connected to detectors (6) permits automatically controlling the optical properties of the wide rays of the active film and hence the flow of light which passes through the window. The application of a high frequency field (20 KHz) leaves the narrow rays transparent but induces opacity in the wide rays (10) which become all the more opaque as the field is elevated as indicated in FIG. 3, which shows the transmission of the window as a function of the applied voltage.

The thio-ene resin NOA65 can be replaced by Norland resins such as NOA68 or other resins such as acrylates, the liquid crystal KDKO7 can be replaced with liquid crystals such as 2F-3333 and 2F-3361 of ROLIC®.

II-1 EXAMPLE II-B

Composition: The mixture of a photo-crosslinkable monomer (PN393 of Merck®), of a liquid crystal (KDK07) with dielectric anisotropy changing in sign with frequency, and a polymerizable surface agent (RM9) is placed between two glass plates covered with ITO on one of its surfaces. The ITO surfaces are in contact with the mixture and the spacing between the two glass plates is 8.5 microns. The relative concentrations are 30/70/3. The mixture also contains a photoinitiator (Irgacure® 907 of Ciba-Geigy®) whose weight proportion relative to RM9 is 2%. The glass plates are first assembled by pressing after depositing a peripheral cement joint by serigraphy, the resulting cell has two openings to carry out filling by capillarity, the thickness of the space between the two plates is calibrated by the addition of balls of calibrated diameter to the cement.

Induction of non-uniformity: By using the positive mask of example II-A, the narrow rays (1 mm) are irradiated with a power of 0.6 mW/cm$^2$ for 10 minutes and in the presence of a high frequency electric field (100 V on the specimen, frequency of 20 KHz) applied to the active film by means of two layers of ITO. There is then carried out a cross linking of the film with the negative mask of example II-A and the application of a low frequency field (100 V on the specimen, frequency 500 Hz). The orientation of the molecules of the liquid crystal in the wide zones is perpendicular to the surface and the zone in question appears transparent. The film remains transparent after cutting off the field, thanks to the surface agent.

Shaping: The resulting sandwich comprised by the two glass plates covered with ITO within which has been formed the active film, is placed in a glass component as in example II-A.

Figure 4:
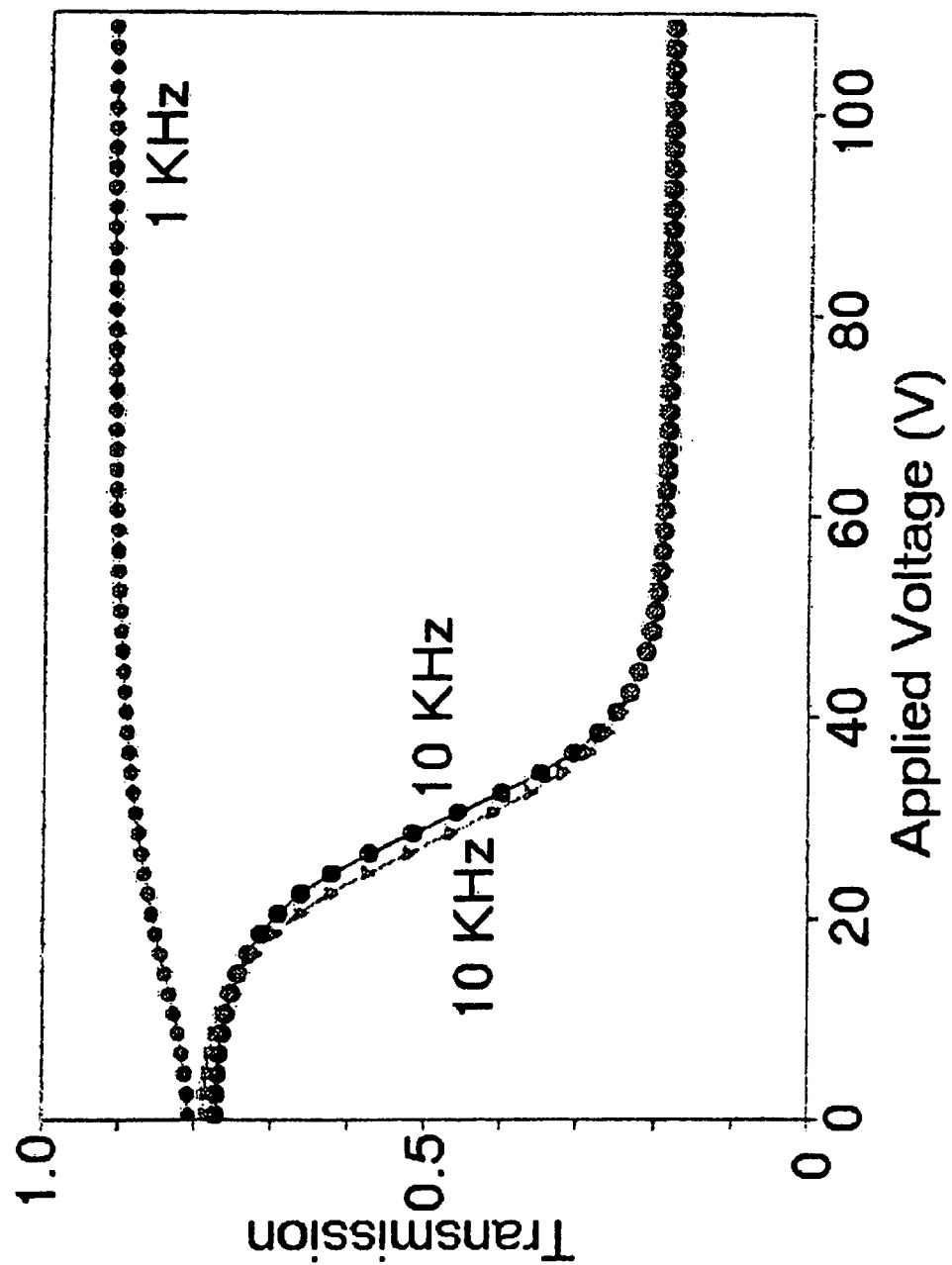

Control: The application of a high frequency field (10 KHz) induces an opacification of the wide rays which becomes the more opaque as the field rises. The transmission of the wide rays as a function of the applied voltage is shown in FIG. 4, in which the responses at 1 and 10 KHz have been shown. The control which permits passing from transparency to opacity, is carried out at 10 KHz by increasing the voltage. Another control mechanism consists in modifying the frequency of the field applied between 1 and 10 KHz while leaving the window under a voltage of 110 V.

The KDK07 can be replaced with the mixture 2F-3361 of ROLIC®. The RM9 can be replaced by components such as CC3939 or CC4070 of Wacker-Chemie GmbH®.

II-1 EXAMPLE II-C

Composition: The mixture of a chiral liquid crystal (KDK07) with dielectric anisotropy changing in sign with the frequency, containing a chiral dopant NXO (Polymage) and a polymerizable surface agent (RM9) is placed between two glass plates covered with ITO on one of the surfaces. The ITO surfaces are in contact with the mixture and the spacing between the two glass plates is 15 microns. The relative concentrations KDK07/NXO are 91/9 and the RM9 represents 7% of the whole. The mixture also contains a photoinitiator (Irgacure® 907) whose weight proportion on RM9 is 2%. The glass plates have first been assembled by pressing after the deposition by serigraphy of a peripheral cement joint. The resulting cell has two openings to carry out filling by capillarity, the thickness of the spacing between the two plates is calibrated by adding balls of calibrated diameter to the cement.

Induction of non-uniformity: By using the positive mask of example II-A, the narrow rays (1 mm) are irradiated with a power of 0.6 mW/cm$^2$ for 20 minutes and in the presence of a low frequency electric field (3 V per micron, 1 KHz) applied to the active film by means of the two ITO layers. The orientation of the molecules of the liquid crystal in this zone is perpendicular to the surface and the zone in question appears transparent. There is then carried out a cross linking of the film with the negative mask of example II-A and the application of a high frequency electric field (3 V per micron, 20 KHz). The active film is transparent after cutting off the field.

Shaping: The resulting sandwich comprised by two glass plates covered with ITO within which has been formed the active film, is placed in a glazed component of the double glazed type as in example II-A.

Figure 5:
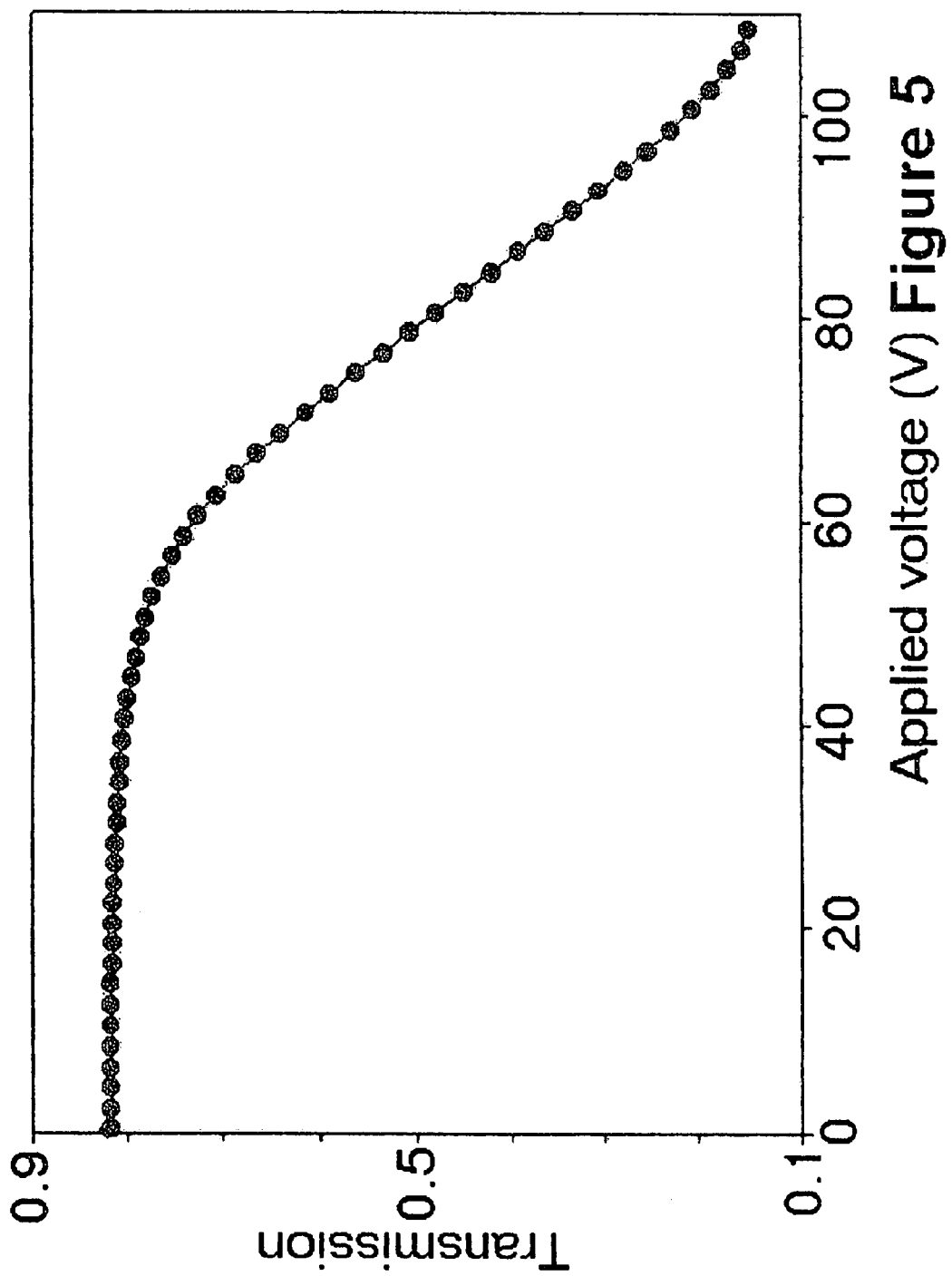

Control: The ultimate application of a low frequency (50 Hz) field modifies the transparency of the wide rays to render them the more opaque as the amplitude of the applied field rises, as indicated in FIG. 5. NXO can be replaced by S811 of Merck®.

RM9 can be replaced by components such as CC3939 or CC4070 of Wacker-Chemie GmbH® or CM7 and CM14 of Polymage.

The KDK07 can be replaced by mixtures 2F-3333 and 2F-3361 of ROLIC®.

III—Active Optical Component Operating Over a Wide Spectral Range Obtained by Spatial Modulation in the Thickness of the Component and Association of said Active Component with Other Active Components to Extends its Range of Utilization.

EXAMPLE III-A

Active optical component reflecting light over a wide spectral band and obtained by a spatial modulation throughout the thickness of the component, adapted to be integrated into a window.

Composition: A liquid crystal mixture, constituted by a nematic with high positive dielectric anisotropy (BN5 Polymage) and a right chiral liquid crystal (NXL, Polymage) such that the selective reflection obtained for the mixture will be in the ultraviolet (UV), the visible or the infrared, is used. Thus a mixture containing respectively 64 parts of BN5 and 36 parts of NXL produces a selective reflection of 400 nm. The addition of a chiral surface agent (RM9) in a small proportion (less than 20%) that can polymerize under UV and whose interval has an inverse chirality (left) from the liquid crystal mixture permits modifying greatly the selective reflection because the direction of rotation of the two mixed chiral compounds are reversed. Thus the selective reflection passes from 400 nm without RM9 to 440 nm with 3% of surface agent, 490 nm with 6%, 540 nm with 10%.

Introduction of non-uniformity: The mixture with 10% is placed between two glass plates covered with ITO on one of its surfaces such that the ITO surfaces will be in contact with the liquid crystal. The mixture is irradiated with UV from above such that there exists a decrease of UV power when placed at a greater and greater depth into the interior of the resulting film. This effect is obtained either by including in the mixture, at a very low proportion (less than 1%), a UV absorbent of the Tinuvin® type produced by Ciba-Geigy®, or by using a very low irradiation power (0.06 mW/cm$^2$) such that when the polymerizable RM9 is consumed in the exposed zones, a movement of the molecules of this compound takes place from the weakly exposed zones in which its concentration is great, toward the more strongly exposed zones where the consumption of the compound gives rise to impoverishment of the monomer not yet polymerized. The decrease in the penetration of the irradiation gives rise to an increase of an inhomogenous microcomposite structure constituted of polymer and liquid crystal, denser toward the surface near the UV (upper surface of the specimen). The greater the density of the polymer network, the greater the selective reflection of the chiral microcomposite polymer/liquid crystal has a longer wavelength. The upper portion of the optical film formed thus reflects selectively the light corresponding to the highest wavelengths and the lower part selectively reflecting the light corresponding to the lower wavelengths. By this process of production there has thus been produced a gel polymer whose density varies with the thickness of the specimen. This spatial inhomogeneity of density of the gel polymer results in a reflection of the light in a wide spectrum and with a metallic gray color of the specimen. It is to be noted that the dissymmetry of the gel results in the reflection band not being identical according to whether the specimen is observed from above (surface for penetration by UV) or from below. The thickness of the specimen and the operative conditions have been selected such that the specimen will be active, which is to say that a reversible modification of the orientation of the liquid crystal exists in all the portions of the gel under the influence of an applied field whose maximum amplitude is 220 V.

Shaping: The resulting active optical component is, as in example II-A, integrated into a double glazing used as a glazing component for the control of solar flux.

Figure 6:
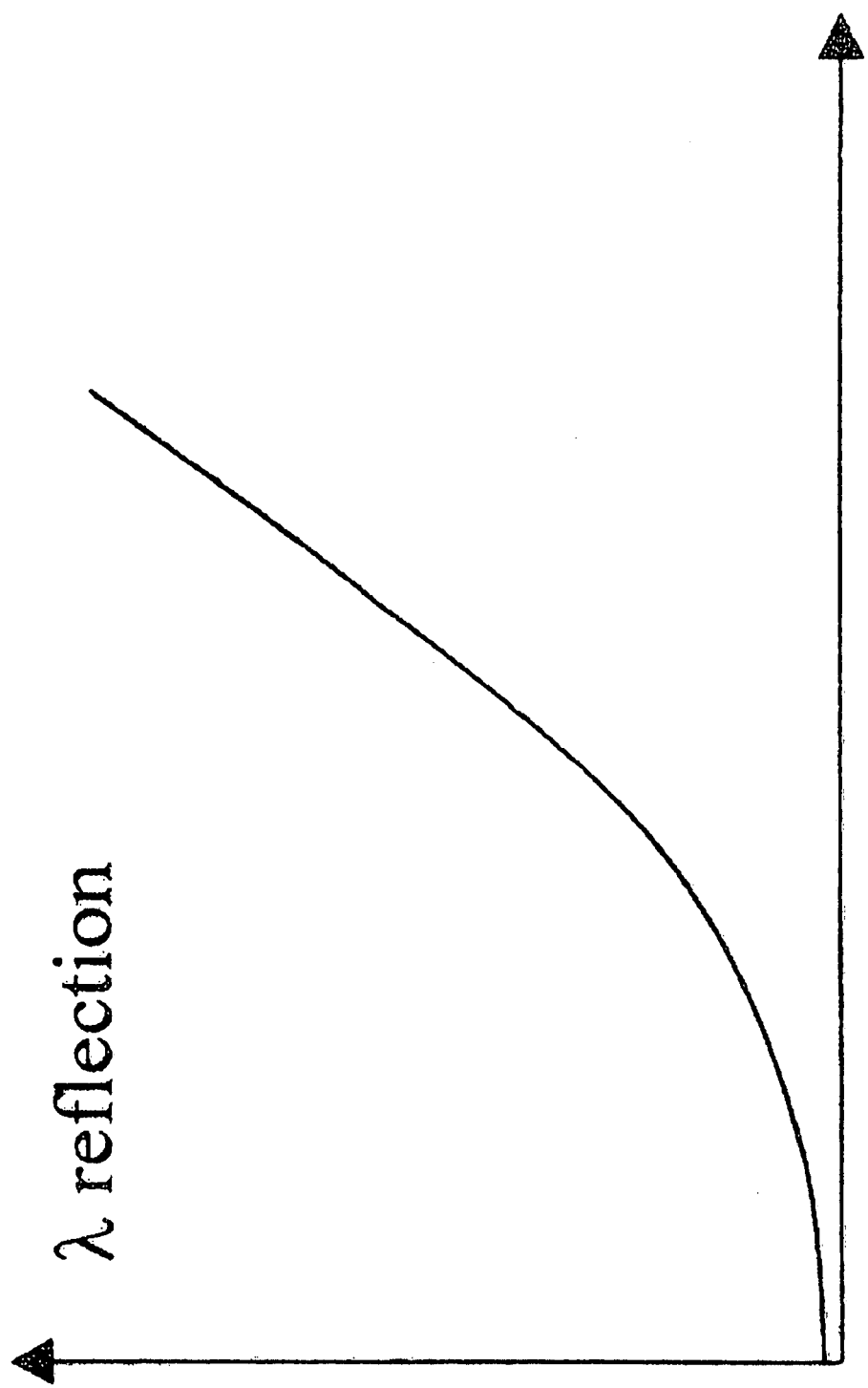
FIG. 6 shows the case of an active component reflecting light over a wide spectral band and attained by spatial modulation in the thickness of the component.
Figure 7:
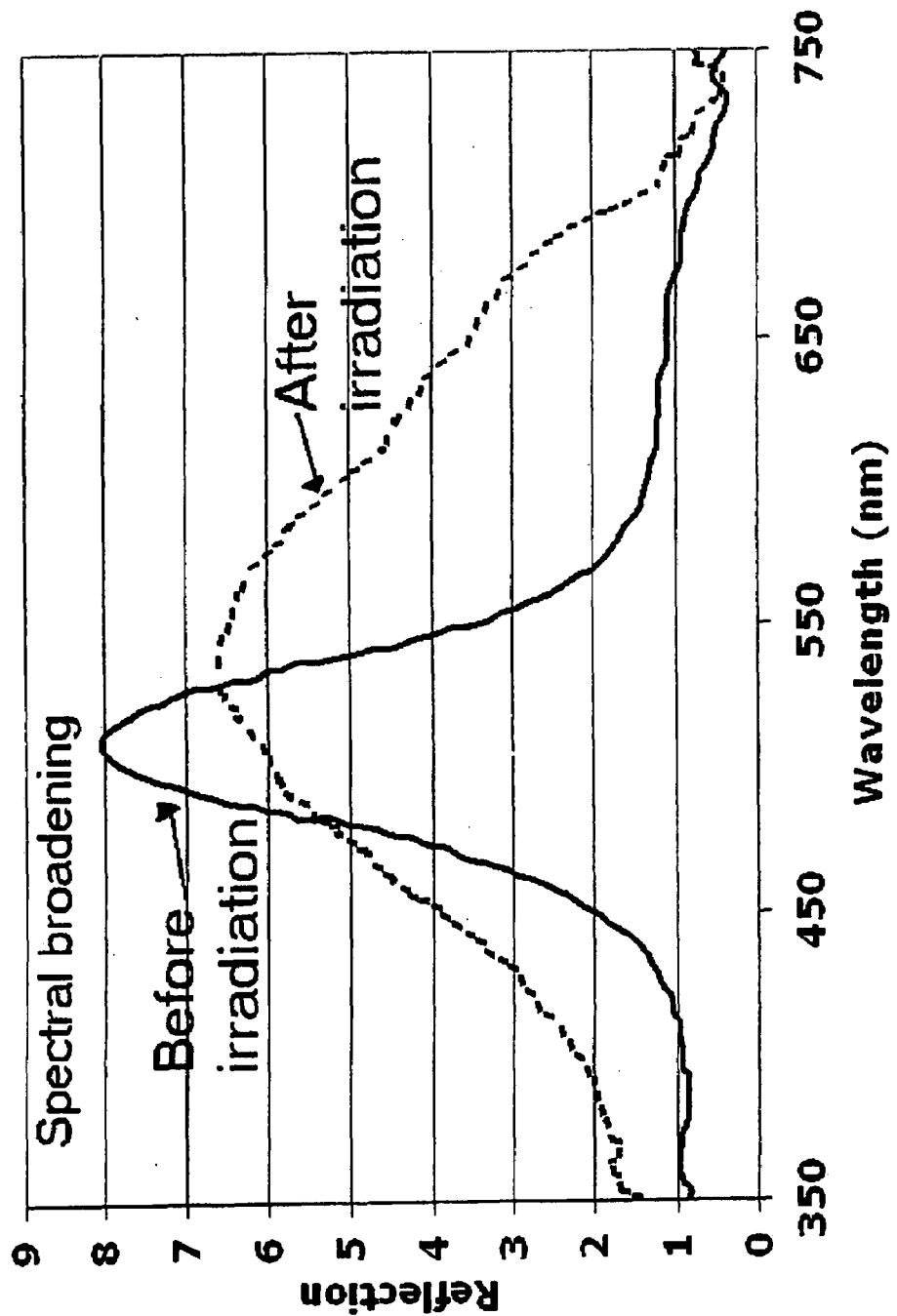
FIGS. 7 and 8 shows variations of reflectivity of a component as a function of the wavelength, according to two other examples.
Figure 8:
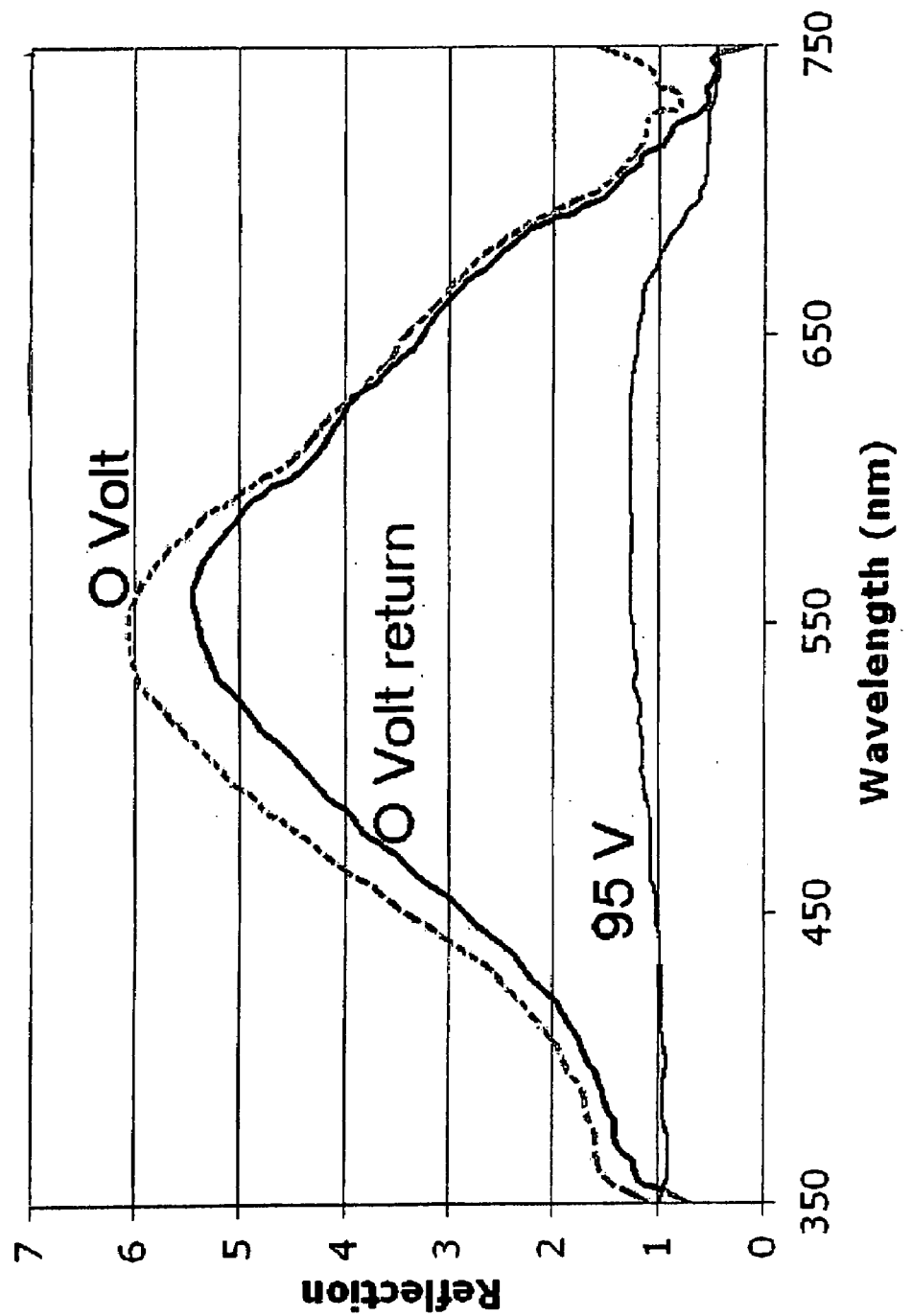

Control:

FIG. 7 compares the spectral bands obtained before and after irradiation. The width of the initial band of 70 nm is exceeded at 200 nm. The same type of result is obtained by replacing the component RM9 by a compound such as RM257 of Merck®; the enlargement of the spectral band still exists but is weaker. The same type of enlargement is obtained with a small percentage of Tinuvin® (1%) added to the precursor. FIG. 8 shows the effect of the application of a voltage of 95 V on an optical component, of 15 microns thickness and reticulated with a power of 0.09 mW/cm$^2$. Before application of the voltage, the specimen has a wide reflection band of 200 nm centered about 550 nm. The applied voltage permits eliminating this reflection band. The elimination of the voltage permits returning to a condition very near the original condition. FIG. 6 shows the variations of the wavelength of reflection associated with the interval of the chiral liquid crystal structure as a function of the concentration of the functional monomer RM9. To obtain good reversibility, the concentration of chiral monomer should not be too great (<10%) so that the gel formed in the upper portion of the film will not be too dense thereby to permit response in an electric field which will not be too slow.

The optical component with a wide band of reflection, electrically controllable and integrated into a window, can also be used in other optical applications requiring a wide band reflection.

Other nematic mixtures available commercially are for example YM6 of Valiant Fine Chemicals, E7, E90 and the chiral compounds such as CE1 to CE11 or CB15 or else C15 sold by the Merck® company can be used in this type of application.

RM9 can for example be replaced by components such as CC3939 or CC4070 of the Wacker-Chemie GmbH®.

EXAMPLE III-B

Optically active component operating in a very wide range of spectra, obtained by a spatial modification through the thickness of the component and association of said active component with other active compounds to extend it scope of use.

An active film, comprised between two plastic substrates covered with ITO, analogous to that of example II-A, is produced. After preparation, the plastic substrate covered with ITO is withdrawn from the upper surface of the active film. On this same surface there is then deposited a transparent conductive coating constituted by a solution of conductive polymer CCP 105 T of Bayer® and a layer of the constituent material of example III-A. On the upper portion of this latter layer, a plastic film covered with ITO is emplaced and constitutes the second transparent electrode of the material analogous to that produced with III-A. The process of polymerization used is identical to the one present in example III-A. An active bilayer component thus obtained in which each active layer, which can be controlled independently, has the properties described above.

IV—Optically Active Component of the Infrared Modulator Type

EXAMPLE IV-A

Optically active component modulating the light over a wide spectral band in the spectrum of wavelengths near infrared and obtained by spatial modulation through the thickness of the component.

Figure 9:
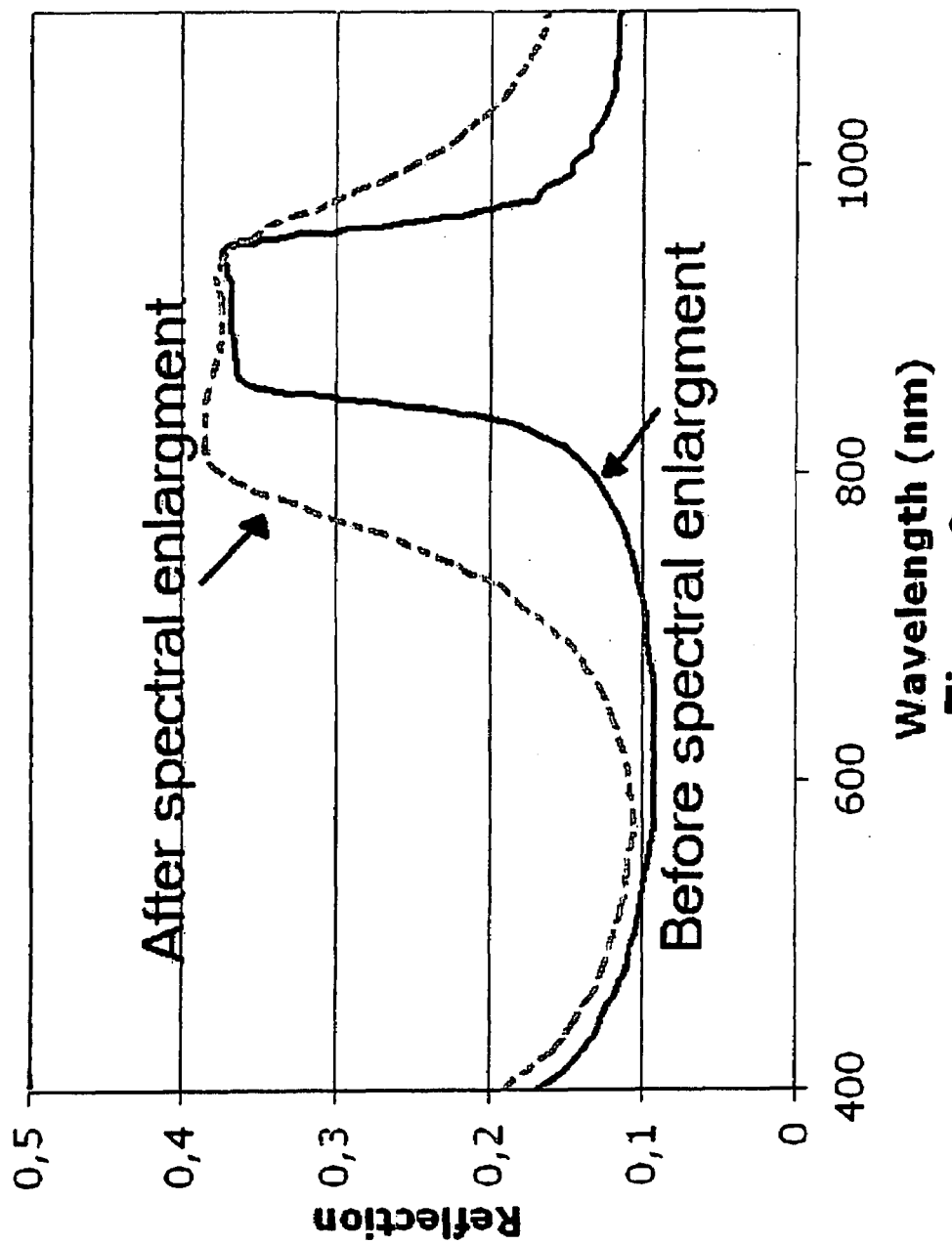
FIGS. 9 to 11 show the results obtained for two cases of application of the invention to an active optical component of the infrared modulator type.

Composition: There is used a nematic (YM6) whose dielectric anisotropy is positive and the chiral compound is constituted by a mixture of AOL and CML (Polymage) and of an active chiral RM9 as previously. The mixture is placed between two glass plates of 1.1 mm thickness covered with ITO on which a film of brushed polyimide has first been deposited. They can be preferably replaced by a material such as polypropylene having a better transmission in the near infrared and which is covered with a transparent electrode. The irradiation takes place at 0.06 mW/cm$^2$ for 15 minutes. For a thickness of the mixture of 11 microns and of relative proportions YM6/AOL/CML of 80/6/3 to which there is added 3% of RM9 by weight of the total, the observed reflection wavelength is in the near infrared (0.9 micron) (FIG. 9).

Introduction of non-uniformity: Procedure as in example III-A.

Shaping: The resulting sandwich comprised of the two glass plates covered with ITO and within which has been formed the active film, constitutes in this condition the optical component.

Figure 10:
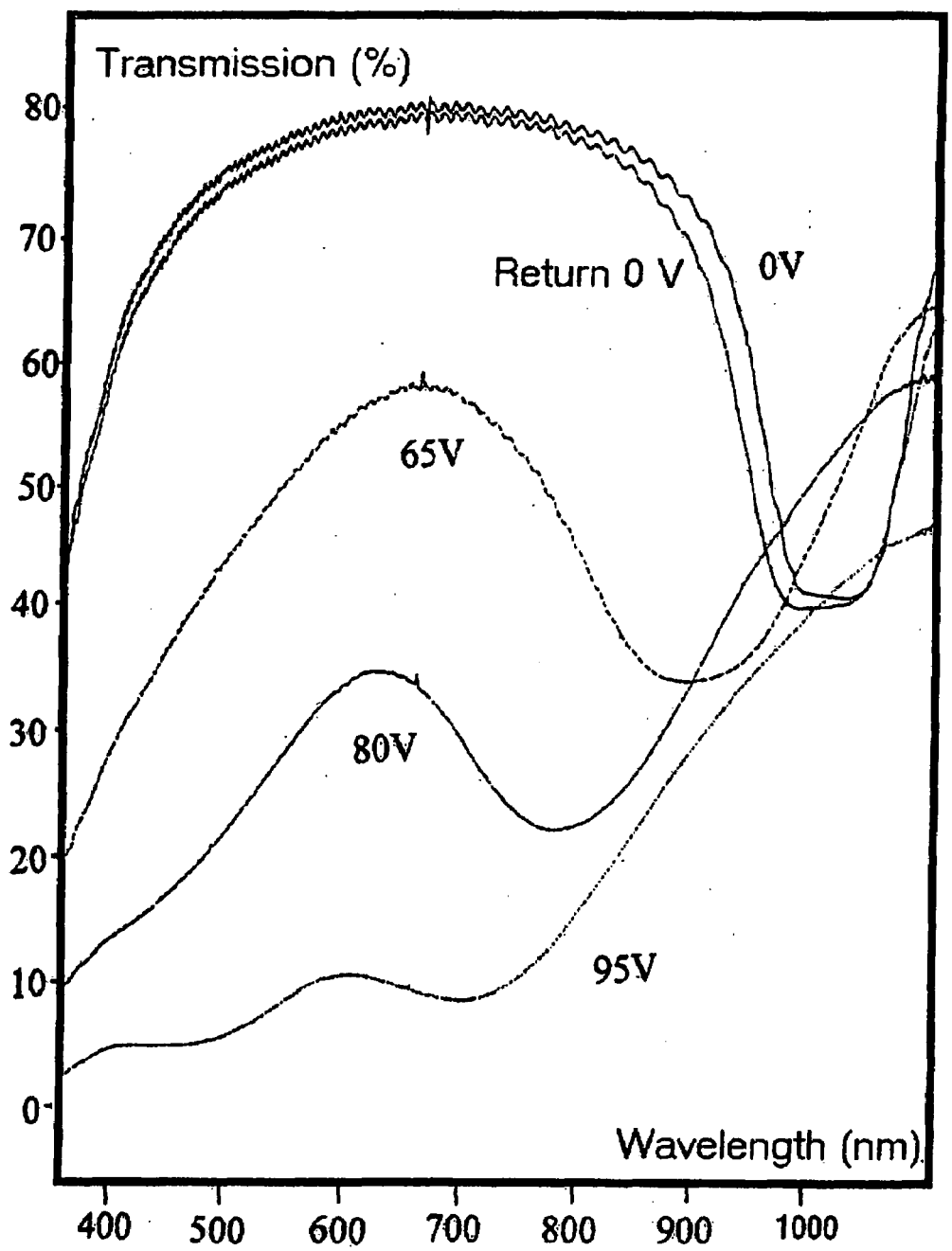

Control: The application of a low frequency voltage (50 Hz) modifies the reflection band and hence the transmission of the component. The application of a voltage of 95 volts renders the component diffusive and a return to 0 volts permits recovering the initial reflectivity (or transmission). FIG. 10 shows the effect of voltage on transmission. A voltage of 180 volts renders the specimen transparent to infrared. The YM6 can be replaced by the compounds E7 or E90 of Merck® or BN5 of Polymage.

The RM9 can be replaced by a component such as CC3939 or CC4070 of Wacker-Chemie GmbH®.

The AOL and the CML can be replaced by compounds such as ZLI 3786 of Merck®.

EXAMPLE IV-B

Optically active component modulating the light over a wide spectral band in the region of wavelengths of visible light and of near infrared and obtained by a spatial modification in the plane of the component.

Composition: There is used a nematic YM6 whose dielectric anisotropy is positive, the chiral compound NXL and a chiral additive RM9 as in example IV-A. The mixture is disposed between two glass plates of 1.1 mm thickness covered with ITO, on which a film of brushed polyimide has first been deposited. The irradiation takes place at 0.06 mW/cm$^2$ for 15 minutes. For a thickness of the mixture of 8.5 microns and the relative proportions YM6/NXL of 63/27 to which 7% RM9 is added, the wavelength of observed reflection is in the near infrared (0.7 microns).

Figure 11:
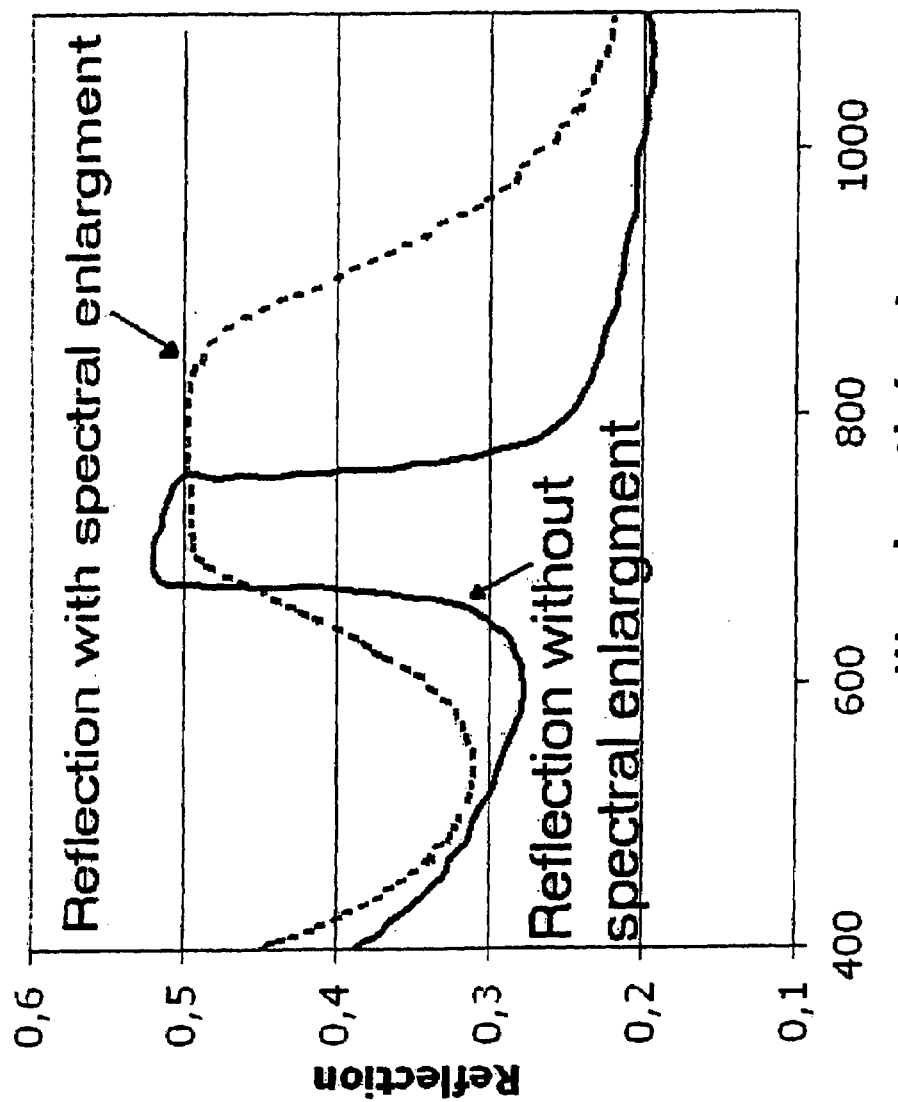

Introduction of non-uniformity: The preceding spatial modulation carried out (example IV-A) in a direction perpendicular to the glass plates of the component, can be completed by a modulation parallel to the latter. One of the means consists in having a mask which has for its design a series of alternately black and transparent rays or any other design having a spatial modification of the levels of gray, and placing it between the film and the UV irradiation. The use of a mask comprises a series of alternately black and transparent zones (in the present case with a width of 1 mm for both types of bands) shows that the exposed zones reflect a weaker wavelength than the wavelength with liquid crystal material before irradiation and that the irradiated zones have a very marked enlargement, connected in particular to the diffusion of the monomers from the unexposed zones toward the exposed zones (FIG. 11). FIG. 11 shows the spectral enlargement obtained: the initial strip has tripled in width. Although initially it was in the visible and at the upper limit of this latter, it now encroaches on the near infrared.

Shaping: The resulting sandwich comprised by two glass plates covered with ITO, within which has been formed the active film, constitutes in this condition the optical component.

Control: It is effectuated as in example IV-A

The RM9 can be replaced by components such as CC3939 or CC4070 of Wacker-Chemie GmbH®. The NXL can be replaced by a compound such as ZLI 3786 of Merck®.

In example IV-B, the width of the spectral band which it is possible to modulate is about 250 nm. Wider bands (up to 400 nm and more) can be obtained by modification of the birefringence of the mixtures and of the wavelength of reflection before enlargement. A high birefringence and an initial high wavelength of reflection lead to an important natural enlargement. This natural enlargement is increased by spatial modulation to obtain a supplemental induced enlargement. The modulations in the plane of the component and perpendicular to this latter can of course be combined for this purpose.

REFERENCES

1. Optical component
2. Active film
3. Transparent electrodes
4. External glass plate
5. Internal glass plate
6. Detector
7. Means for applying an electric field
8. Layer of air
9. Wall
10. Opaque rays
11. Opaque designs

The invention claimed is:

1. A precursor for the preparation of a material with optical properties modifiable under the action of at least one external parameter, which comprises:
   a component A comprising polymerizable monomers or oligomers,
   a component B comprising one or several liquid crystals of low molecular weight or polymers and having a type of molecular order that is nematic, cholesteric or smectic or having polymorphism, and
   at least one surface agent C whose molecules have an affinity both for component A and component B and comprising simultaneously one or several chemical groups that can attach chemically to the constituents of component A, and on the other hand, one or several chemical groups comprising a mesogenic portion compatible with the mesomorphic phase of component B so as to control the interfacial properties between said components A, B during polymerization.

2. The precursor according to claim 1, wherein the surface agent is polymerizable.

3. The precursor according to claim 1, wherein component B comprises at least one liquid crystal with dielectric anisotropy, changing in sign under the action of the external parameter or parameters.

4. The precursor according to claim 1, wherein component B comprises at least one liquid crystal with positive dielectric anisotropy.

5. The. precursor according to claim 1, wherein component B comprises at least one liquid crystal with negative dielectric anisotropy.

6. The precursor according to claim 1, wherein said precursor further comprises a photoinitiator compound for polymerization by a photochemical action.

7. The precursor according to claim 1, wherein component B further comprises one or several additives selected from colorants, photochromic compounds and chiral dopants that are mesomorphic or not.

8. The precursor according to claim 1, wherein said precursor has in weight proportion:
   60 to 80% of component A
   40 to 20% of component B
   and wherein said surface agent C represents 1 to 5% of the whole of components A and B, in weight proportions.

9. The precursor according to claim 1, wherein said precursor has, in weight proportions:
   70 to 97% of component B
   30 to 3% of surface agent C and component A.

10. The precursor according to claim 1 wherein
    component A comprises monomers selected from acrylates or methacrylates,
    component B is a liquid crystal or a mixture of liquid crystals, and wherein
    the surface agent C comprises comb polymers having reactive groups selected from acrylates or methacrylates and containing mesogenic groups compatible with the mesomorphic phase of component B.

11. The precursor according to claim 10 wherein the comb polymers of the surface agent C have a siloxane skeleton and the methacrylate function in the side chain.

12. The precursor according to claim 1, wherein component A comprises monomers or oligomers, which by crosslinking in the presence of other compounds will provide a plastic material, and wherein surface agent C is a surface active agent which controls the interfacial properties of said liquid crystal and said polymer to induce a temporary spatial non-uniformity of the material.

13. The precursor according to claim 12, wherein said plastic material is a gel or micro-composite.

14. The precursor according to claim 12, wherein said precursor has in weight proportion:
    60 to 80% of component A
    40 to 20% of component B
    and wherein said surface agent C represents 1 to 5% of the whole of components A and B, in weight proportions.

15. The precursor according to claim 12, wherein said precursor has, in weight proportions:
    70 to 97% of component B
    30 to 3% of surface active agent C and component A.

16. The precursor according to claim 12 wherein
    component A comprises monomers selected from acrylates or methacrylates,
    component B is a liquid crystal or a mixture of liquid crystals, and wherein
    the surface agent C comprises comb polymers having reactive groups selected from acrylates or methacrylates and containing mesogenic groups compatible with the mesomorphic phase of component B.

17. The precursor according to claim 12 wherein the comb polymers of the surface agent C have a siloxane skeleton and the methacrylate function in the side chain.

* * * * *